US011760666B2

(12) United States Patent
Frail

(10) Patent No.: US 11,760,666 B2
(45) Date of Patent: Sep. 19, 2023

(54) METHODS AND COMPOSITIONS TO REDUCE AZOLES AND AOX CORROSION INHIBITORS

(71) Applicant: BL Technologies, Inc., Minnetonka, MN (US)

(72) Inventor: Paul Robert Frail, Trevose, PA (US)

(73) Assignee: BL Technologies, Inc., Minnetonka, MN (US)

( * ) Notice: Subject to any disclaimer, the term of this patent is extended or adjusted under 35 U.S.C. 154(b) by 321 days.

(21) Appl. No.: 16/970,679

(22) PCT Filed: Mar. 1, 2019

(86) PCT No.: PCT/US2019/020204
§ 371 (c)(1),
(2) Date: Aug. 18, 2020

(87) PCT Pub. No.: WO2019/173123
PCT Pub. Date: Sep. 12, 2019

(65) Prior Publication Data
US 2020/0377392 A1 Dec. 3, 2020

Related U.S. Application Data

(60) Provisional application No. 62/640,163, filed on Mar. 8, 2018.

(51) Int. Cl.
*C02F 1/68* (2023.01)
*C02F 1/72* (2023.01)
*C02F 5/10* (2023.01)
*C02F 11/10* (2006.01)
*C23F 11/10* (2006.01)
*C02F 101/36* (2006.01)
*C02F 101/38* (2006.01)
*C02F 103/02* (2006.01)

(52) U.S. Cl.
CPC ............... *C02F 1/683* (2013.01); *C02F 1/72* (2013.01); *C02F 5/10* (2013.01); *C23F 11/10* (2013.01); *C02F 2101/36* (2013.01); *C02F 2101/38* (2013.01); *C02F 2103/023* (2013.01); *C02F 2303/08* (2013.01)

(58) Field of Classification Search
None
See application file for complete search history.

(56) References Cited

U.S. PATENT DOCUMENTS

| | | |
|---|---|---|
| 3,803,047 A | 4/1974 | Hwa |
| 3,837,803 A | 9/1974 | Carter |
| 3,935,125 A | 1/1976 | Jacob |
| 3,960,576 A | 6/1976 | Carter |
| 4,184,991 A | 1/1980 | Scheurman, III |
| 4,246,030 A | 1/1981 | Lipinski |
| 4,303,568 A | 12/1981 | May |
| 4,406,811 A | 9/1983 | Christensen |
| 4,497,713 A | 2/1985 | Geiger |
| 4,642,221 A | 2/1987 | Hansen |
| 4,659,480 A | 4/1987 | Chen |
| 4,659,481 A | 4/1987 | Chen |
| 4,659,482 A | 4/1987 | Chen |
| 4,663,053 A | 5/1987 | Geiger |
| 4,664,884 A | 5/1987 | Mullins |
| 4,701,262 A | 10/1987 | Chen |
| 4,708,815 A | 11/1987 | Chen |
| 4,732,698 A | 3/1988 | Chen |
| 4,759,851 A | 7/1988 | Chen |
| 4,801,387 A | 1/1989 | Chen |
| 4,913,822 A | 4/1990 | Chen |
| 5,092,118 A | 3/1992 | VanDeMark |
| 5,128,065 A | 7/1992 | Hollander |
| 5,141,675 A | 8/1992 | Vanderpool |
| 5,256,332 A | 10/1993 | Kessler |
| 5,616,278 A | 4/1997 | Carey |
| 5,746,947 A | 5/1998 | Vanderpool |
| 5,772,919 A | 6/1998 | Reichgott |
| 5,773,627 A | 6/1998 | Anderson |
| 5,800,732 A * | 9/1998 | Coughlin .................. C02F 5/08 210/759 |
| 5,863,463 A | 1/1999 | Reichgott |
| 5,863,464 A | 1/1999 | Reichgott |
| 5,874,026 A | 2/1999 | Pilsits, Jr. |

(Continued)

FOREIGN PATENT DOCUMENTS

| | | |
|---|---|---|
| EP | 0592118 B1 | 7/1996 |
| EP | 1379475 B1 | 7/2009 |

(Continued)

OTHER PUBLICATIONS

International Search Report and Written Opinion issued in International Application No. PCT/US2019/020204 dated Aug. 19, 2019; 16 pages.
"Carbon steel", Wikipedia article, archived online on Nov. 23, 2017 at URL: https://web.archive.org/web/20171123211006/https://en.wikipedia.org/wiki/Carbon_steel.
Ferreira et al., "(Un)suitability of the use of pH buffers in biological, biochemical and environmental studies and their interaction with metal ions—a review", RSC Adv., 2015,5, 30989-31003, DOI: https://doi.org/10.1039/C4RA15453C.

(Continued)

Primary Examiner — Clare M Perrin
(74) Attorney, Agent, or Firm — Armstrong Teasdale LLP

(57) ABSTRACT

A method to reduce or eliminate N-heterocycles, the method providing one or more environmentally benign chelators (EBCs) to an aqueous cooling system, the aqueous cooling system having at least one N-heterocycle in the presence of a halogenating or non-halogenating oxidizer. A method to reduce or eliminate AOX, the method providing one or more environmentally benign chelators (EBCs) to an aqueous cooling system, the aqueous cooling system having at least one AOX-containing species in the presence of a halogenating biocide.

14 Claims, No Drawings

(56) References Cited

U.S. PATENT DOCUMENTS

| | | |
|---|---|---|
| 6,464,901 B1 | 10/2002 | Cheng |
| 9,771,336 B2 | 9/2017 | Seetharaman |
| 2010/0123100 A1 | 5/2010 | Gill |
| 2010/0178197 A1 | 7/2010 | Sotoudeh et al. |
| 2013/0105406 A1* | 5/2013 | Van Der Wal ........ C02F 1/4691 |
| | | 204/239 |
| 2015/0118103 A1* | 4/2015 | Erickson ............... C23F 11/187 |
| | | 422/7 |
| 2016/0222163 A1 | 8/2016 | Detering et al. |
| 2016/0319442 A1 | 11/2016 | Gulabani et al. |
| 2016/0348251 A1 | 12/2016 | Seetharaman et al. |

FOREIGN PATENT DOCUMENTS

| | | |
|---|---|---|
| EP | 2961862 B1 | 10/2017 |
| EP | 3455394 A1 | 3/2019 |
| WO | 2017197047 A1 | 11/2017 |

OTHER PUBLICATIONS

Konstantinos et al., "Degradation of Phosphonate-Based Scale Inhibitor Additives in the Presence of Oxidizing Biocides: 'Collateral Damages' in Industrial Water Systems", Separation Science and Technology, 42:7, 1639-1649, published online Jun. 1, 2007, https://doi.org/10.1080/01496390701290532.
Office Action and Search Report issued in Chinese Patent Application No. 201980017981.1, dated Jun. 30, 2022, with English translation, 16 pages.

\* cited by examiner

METHODS AND COMPOSITIONS TO REDUCE AZOLES AND AOX CORROSION INHIBITORS

CROSS REFERENCE TO RELATED APPLICATION

This application is a national phase of International Patent Application No. PCT/US2019/020204 filed Mar. 1, 2019, which claims the priority benefit of U.S. Provisional Patent Application Serial No. 62/640,163 filed Mar. 8, 2018, the entireties of which are incorporated herein by reference.

FIELD OF INVENTION

This invention relates to methods and compositions to reduce or eliminate N-heterocycles and/or AOX (Adsorbable Organic Halides), and more particularly, to reduce or eliminate azoles and/or AOX from industrial cooling systems while maintaining proper corrosion protection.

BACKGROUND OF THE INVENTION

Industrial systems use water as the medium for heating and cooling applications. These recirculating systems can be closed or open to the environment. Open recirculating cooling systems include various features that utilize metal piping, condensers, and heat exchangers. The chosen metallurgy can vary from very noble metals, such as titanium or numerous types of stainless steel, to less noble metals like low carbon steel and various alloys of yellow metal such as copper, ADM, and copper nickel.

Water and the various salt ions composed within it are naturally corrosive to many types of metallurgy. The chlorides and sulfates in combination with the dissolved oxygen can cause general or localized corrosion cells to form on the metal surface. In open recirculating cooling systems, the water becomes concentrated as it passes over cooling towers further increasing the corrosivity as measured by known indexes, such as the Larson-Scoll Index, which correlates corrosion rates with concentration of chlorides and sulfates. Due to the operating conditions, open recirculating industrial systems can carry and promote microbiological growth. These microorganisms can elevate the corrosivity of the concentrated water by either forming biofilms, whose respiratory waste produces chlorides and sulfates or the treatment required to control their population.

A common and cost-effective treatment of microorganisms is the use of oxidizing biocides. Oxidizing biocides can be categorized into two types: those that are halogenating (chlorine and bromine varieties) and those that are non-halogenating (chlorine dioxide, inorganic peroxides, organic peroxides, and ozone). Halogenating oxidizers can react with organic material or industrial chemical treatments for scale and corrosion control producing absorbable organic halides (AOX). All oxidizers increase the corrosivity of the water as they have oxidation potentials high enough to circumvent the traditional cathodic corrosion reaction with oxygen and accept electrons from the base metal accelerating general and localized corrosion.

Due to the salt concentration, microbiological growth, and the use of oxidizers, industrial systems are often treated with corrosion inhibitors. Precipitating salts are a common approach for iron based metallurgies utilizing specific control of salts supersaturation and inhibition with molecular and polymeric treatments. Typical cathodic inhibiting salts used are calcium carbonate and calcium phosphate. Surface films are readily formed and controlled by corresponding scale inhibitors. These passivation films are on the order of a micron in thickness and are not considered fouling or scaling as they minimally interfere with heat transfer process. When conditions in the water are such that calcium carbonate and phosphate are not effective enough, various metals may be added in low dosages to complement or as a substitute. Typical metals include a variety of transition, p-block, and f-block metals: Cr, Mo, W, Ti, Mn, Al, As, Sn, Zn, La, Eu, or the like.

Alternatively, organic based molecules and polymers featuring p-block elements have become common corrosion inhibitors for both iron and copper metallurgies. Those featuring nitrogen atoms have shown utility for iron and copper based surfaces. Specifically, molecules or polymers featuring nitrogen heterocycles. The industrial standard for treating yellow metal surfaces is the use of substituted azoles, specifically, the benzotriazole family.

Unfortunately, many N-heterocycles (like azoles) feature unfavorable biodegradability and toxicity profiles. This can be seen within the benzotriazole family where (due to the poor biodegradability and molecular stability of this class of molecules) they escape the waste water treatment process and bioaccumulate in rivers and lakes. This is further compounded by the associated aquatic toxicity profile. There exists a need to reduce or eliminate the use of N-heterocycles as an industrial chemical treatment in favor of "greener" alternatives, while providing equivalent or improved corrosion inhibition of iron and copper based metallurgies. In the case of copper, it is also necessary to provide the ability to control copper discharge via a chelation and precipitation chemical reaction.

The common use of halogenating biocides in concentrations above 0.5 ppm residual free halide is to minimize risks associated with *Legionella*, which also creates a growing concern regarding AOX. N-heterocyclic species will readily react in-situ of an industrial system that is feeding a halogenating biocide. The halogen that is added to the N-heterocycle may exists in an equilibrium, where the halogen exists as a transient species, or is permanently covalently attached to the N-heterocycle such that either way the AOX contribution in the industrial system has increased by some amount. The azole family of inhibitors has often run into this issue where benzotriazole or tolyltriazole have been shown to chlorinate or brominate under industrial cooling conditions resulting in either loss of inhibitor, production of malodor, and increase in AOX. Thus, AOX species are inherently toxic as seen within the flame retardant industry and more health and environment regulations wish to minimize or reduce the amount of AOX.

A common practice to minimize N-heterocycles reactivity with halogenating biocides is to incorporate a halogen at specific sites or such that it augments the N-heterocycle in a way where the new molecule is thermodynamically or sterically blocks the in-situ reaction. This ex-situ process unfortunately results in the production of an inherent AOX species, when a halogen is added to the parent molecule, and provides improved corrosion performance. This is what was seen in the case of the development of chloro- and bromo-tolytriazole.

There exists the need to develop new corrosion control programs and inhibitors that reduce or eliminate AOX from industrial treatment programs. Accordingly, there exists a need to reduce or minimize N-heterocyclic species, such as azoles, from industrial water treatment programs due to their poor biodegradation and corresponding bioaccumulation of a class of molecules that can have impactful toxicity profiles.

Similarly, there is a need to reduce or minimize industrial corrosion treatment programs contribution to AOX species under halogenating oxidizing conditions due to either the formation of in-situ transient halo N-heterocycles or the use of ex-situ halo N-heterocycles. Therefore, it is desirable to develop "greener" inhibitors and overall corrosion programs that achieve the preceding accomplishments and present with equal or improved performance.

SUMMARY OF THE INVENTION

The disclosed technology generally described hereinafter provides for to reduce or eliminate azoles (N-heterocycles) or AOX from industrial cooling systems.

According to one aspect of the disclosed technology, a method to reduce or eliminate N-heterocycles is provided. The method comprises providing one or more environmentally benign chelators (EBCs) to an aqueous cooling system, the aqueous cooling system comprising at least one N-heterocycle in the presence of a halogenating or non-halogenating oxidizer.

In some embodiments, the environmentally benign chelators (EBCs) comprise (1) amino polycarboxylic acids, (2) polyamino acids or nucleic acids, (3) buffers, or (4) mixtures of amino alkylene phosphonic acids and their corresponding hydrolysis products.

In some embodiments, the amino polycarboxylic acids comprise substituted amino acids having —COOH and/or —PO3, or a combination thereof. In some embodiments, the amino polycarboxylic acids comprise one or more amino functional groups, wherein the amino polycarboxylic acid is ethylenediamine tetraacetic acid, N-(2-Hydroxyethyl)ethylenediaminetriacetic acid, diethylenetriaminepentaacetic acid, Nitrilotriacetic acid, methylglycin diacetic acid (MGDA), N,N-Dicarboxymethyl glutamic acid tetrasodium salt, (2R,3R,4S,5R,6R)-3,4,6-trihydroxy-5-sulfooxyoxane-2-carboxylic acid, or Ethylenediamine-N,N'-disuccinic acid. In some embodiments, the polyamino acid is polyaspartic acid or a peptide comprising more than one amino acid.

In some embodiments, a buffer is selected from the group consisting of N-(2-Acetamido)-2-aminoethanesulfonic acid, N-(2-acetamido)iminodiacetic acid, adenosine monophosphate, 2-amino-2-methylpropane-1,3-diol, 2-hydroxy-3-[(2-hydroxy-1,1-dimethylethyl)amino]-1-propanesulfonic acid, N,N-Bis(2-hydroxyethyl)-2-aminoethanesulfonic acid, Bicine, Bis-Tris, 1,3-bis(tris(hydroxymethyl)methylamino) propane, calcium alkyl benzene sulphonate, N-cyclohexyl-3-aminopropanesulfonic acid, N-cyclohexyl-2-hydroxyl-3-aminopropanesulfonic acid, 2-(cyclohexylamino) ethanesulfonic acid, 3-(Bis(2-hydroxyethyl)amino)-2-hydroxypropane-1-sulfonic acid, 3-[4-(2-Hydroxyethyl)-1-piperazinyl]propanesulfonic acid, 4-(2-Hydroxyethyl)-1-piperazinepropanesulfonic acid, 4-(4-(2-Hydroxyethyl) piperazin-1-yl)butane-1-sulfonic acid, 4-(2-hydroxyethyl)-1-piperazineethanesulfonic acid, 2-Hydroxy-3-(4-(2-hydroxyethyl)piperazin-1-yl)propane-1-sulfonic acid, 2-(N-morpholino)ethanesulfonic acid, 4-morphoinobutane-1-sulfonic acid, 3-(N-morpholino)propanesulfonic acid, 3-morpholino-2-hydroxypropanesulfonic acid, piperazine-N,N'-bis(2-ethanesulfonic acid), piperazine-1,4-bis(2-hydroxypropanesulfonic acid, 4-((1,3-dihydroxy-2-(hydroxymethyl)propan-2-yl)amino)butane-1-sulfonic acid, 3-((1,3-Dihydroxy-2-(hydroxymethyl)propan-2-yl)amino) propane-1-sulfonic acid, N-[tris(hydroxymethyl)methyl]-3-amino-2-hydroxypropanesulfonic acid, triethanolamine, N-tris(hydroxymethyl)methyl-2-aminoethanesulfonic acid, tricine, tris(hydroxymethyl)aminomethane, or a substituted or a functionalized compound thereof.

In some embodiments, the amino alkylene phosphonic acids are represented by the formula (I)

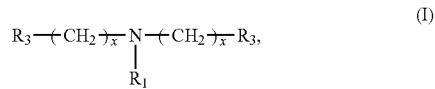

wherein $R_1$ is —$CH_2$—$R_3$, —$(CH_2)_y$—$NR_2$ or —$(CH_2)_y$—NR—$(CH_2)_y$—$NR_2$; and wherein R is —$(CH_2)_x$—$R_3$; $R_2$ is —$(CH_2)_x R_3$; and $R_3$ is —$PO_3$ or —OH, wherein $R_3$ is the same or different, and wherein y is between 1 and 4, and x is between 1 and 4.

In some embodiments, the environmentally benign chelators can be used with a metal cationic salt comprising transition metals, p-block metals, p-block semi metals, $SiO_2$, silicates and metal silicates, lanthanides, and actinides.

In some embodiments, the at least one N-heterocycle is an azole, cyclic amine, lactam, sultam, pyridine, hydro-pyridine, pyridone, pyrazine, pyrimidines, triazine, or azepin. In some embodiments, the azole is an imidazolidone, oxazolidinone, hydantoin, urazole, oxazolidine, imidazolidine, isooxazolidine, pyrazolidine, pyrroline, maleimide, pyrrolin-2-one, 2-isoxazoline, 4-isoxazoline, 2-oxazoline, 3-oxazoline, 2-imidazoline, pyrrole, thiazoline, pyrazoline, 3-pyrazoline, 3H-pyrazole, imidazole, pyrazole, 1,2,3-triazole, 1,2,4-triazole, tetrazole, pentazole, oxazole, isooxazole, 1,2,3-oxadiazole, 1,2,4-oxadiazole, furazan, 1,3,4-oxadiazole, thiazole, isothiazole, 1,2,4-thiadiazole, 1,2,5-thiadiazole, 1,3,4-thiadiazole, or a substituted or a functionalized compound thereof.

In some embodiments, the environmentally benign chelators (EBCs) are added in a concentration greater than a concentration of the at least one N-heterocycle. In some embodiments, the concentration of the at least one N-heterocycle is less than 1.0 ppm. In some embodiments, the method reduces the N-heterocycle content by about 0.1 to 100%. In some embodiments, the non-halogenating oxidizer comprises $ClO_2$, inorganic peroxides, organic peroxides, or ozone.

In yet another aspect of the disclosed technology, a method to reduce or eliminate AOX is provided. The method comprises providing one or more environmentally benign chelators (EBCs) to an aqueous cooling system, the aqueous cooling system comprising at least one AOX-containing species in the presence of a halogenating biocide.

In some embodiments, the environmentally benign chelators (EBCs) comprise (1) amino polycarboxylic acids, (2) polyamino acids or nucleic acids, (3) buffers, or (4) mixtures of amino alkylene phosphonic acids and their corresponding hydrolysis products.

In some embodiments, the amino polycarboxylic acids comprise substituted amino acids having —COOH and/or —PO3, or a combination thereof.

In some embodiments, the amino polycarboxylic acids comprise one or more amino functional groups, wherein the amino polycarboxylic acid is ethylenediamine tetraacetic acid, N-(2-Hydroxyethyl)ethylenediaminetriacetic acid, diethylenetriaminepentaacetic acid, Nitrilotriacetic acid, methylglycin diacetic acid, N,N-Dicarboxymethyl glutamic acid tetrasodium salt, (2R,3R,4S,5R,6R)-3,4,6-trihydroxy-5-sulfooxyoxane-2-carboxylic acid, Ethylenediamine-N,N'-disuccinic acid, or a substituted or a functionalized compound thereof. In some embodiments, the polyamino acid is polyaspartic acid or a peptide comprising more than one amino acid.

In some embodiments, a buffer is selected from the group consisting of N-(2-Acetamido)-2-aminoethanesulfonic acid, N-(2-acetamido)iminodiacetic acid, adenosine monophosphate, 2-amino-2-methylpropane-1,3-diol, 2-hydroxy-3-[(2-hydroxy-1,1-dimethylethyl)amino]-1-propanesulfonic acid, N,N-Bis(2-hydroxyethyl)-2-aminoethanesulfonic acid, Bicine, Bis-Tris, 1,3-bis(tris(hydroxymethyl)methylamino) propane, calcium alkyl benzene sulphonate, N-cyclohexyl-3-aminopropanesulfonic acid, N-cyclohexyl-2-hydroxyl-3-aminopropanesulfonic acid, 2-(cyclohexylamino) ethanesulfonic acid, 3-(Bis(2-hydroxyethyl)amino)-2-hydroxypropane-1-sulfonic acid, 3-[4-(2-Hydroxyethyl)-1-piperazinyl]propanesulfonic acid, 4-(2-Hydroxyethyl)-1-piperazinepropanesulfonic acid, 4-(4-(2-Hydroxyethyl) piperazin-1-yl)butane-1-sulfonic acid, (4-(2-hydroxyethyl)-1-piperazineethanesulfonic acid), 2-Hydroxy-3-(4-(2-hydroxyethyl)piperazin-1-yl)propane-1-sulfonic acid, 2-(N-morpholino)ethanesulfonic acid, 4-morpholinobutane-1-sulfonic acid, 3-(N-morpholino)propanesulfonic acid, 3-morpholino-2-hydroxypropanesulfonic acid, piperazine-N,N'-bis(2-ethanesulfonic acid), piperazine-1,4-bis(2-hydroxypropanesulfonic acid, 4-((1,3-dihydroxy-2-(hydroxymethyl)propan-2-yl)amino)butane-1-sulfonic acid, 3-((1,3-Dihydroxy-2-(hydroxymethyl)propan-2-yl)amino) propane-1-sulfonic acid, N-[tris(hydroxymethyl)methyl]-3-amino-2-hydroxypropanesulfonic acid, triethanolamine, N-tris(hydroxymethyl)methyl-2-aminoethanesulfonic acid, tricine, tris(hydroxymethyl)aminomethane, or a substituted or a functionalized compound thereof.

In some embodiments, the amino alkylene phosphonic acids are represented by the formula (II)

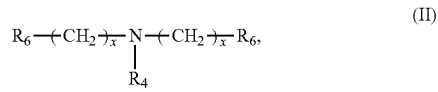

wherein $R_4$ is $-CH_2-R_6$, $-(CH_2)_y-NR_5$ or $-(CH_2)_y-NR'-(CH_2)_y-NR_5$; $R_5$ is $-(CH_2)_x R_6$; and wherein R' is $-(CH_2)_x-R_6$; and $R_6$ is $-PO_3$ or $-OH$, wherein $R_6$ is the same or different, and wherein y is between 1 and 4, and x is between 1 and 4.

In some embodiments, the at least one AOX-containing species comprises (1) an inherently-containing AOX molecule, or (2) a transient containing AOX molecule.

In some embodiments, the inherently-containing AOX molecule is an inherently AOX azole under halogenating or non-halogenating conditions. In some embodiments, the halogenating condition provides a halogenating biocide that comprises bleach, chlorine, bromine, stabilized halogens or halo amines.

In some embodiments, the method lowers the AOX contribution by 0.1 to 100%. In some embodiments, the environmentally benign chelators can be used with a metal cationic salt comprising transition metals, p-block metals, p-block semi metals, $SiO_2$, silicates and metal silicates, lanthanides, and actinides.

In yet another aspect of the disclosed technology, a composition to reduce or eliminate N-heterocycles or AOX from an aqueous cooling system is provided. The composition comprises (i) a dispersant polymer; (ii) a biocide; (iii) a pH adjusting species; and (iv) an environmentally benign chelator, wherein the environmentally benign chelator comprises: (1) an amino polycarboxylic acid, (2) a polyamino acids or nucleic acid, (3) a buffer, or (4) a mixture of amino alkylene phosphonic acid and corresponding hydrolysis products.

In some embodiments, the composition to reduce or eliminate N-heterocycles or AOX from an aqueous cooling system further comprises (vi) a salt inhibitor, a metal inhibitor, or both. In some embodiments, the composition to reduce or eliminate N-heterocycles or AOX from an aqueous cooling system further comprises (vii) at least one N-heterocycle.

In some embodiments, the at least one N-heterocycle is an azole, cyclic amine, lactam, sultam, pyridine, hydro-pyridine, pyridone, pyrazine, pyrimidines, triazine, or azepin. In some embodiments, the azole is an imidazolidone, oxazolidinone, hydantoin, urazole, oxazolidine, imidazolidine, isooxazolidine, pyrazolidine, pyrroline, maleimide, pyrrolin-2-one, 2-isoxazoline, 4-isoxazoline, 2-oxazoline, 3-oxazoline, 2-imidazoline, pyrrole, thiazoline, pyrazoline, 3-pyrazoline, 3H-pyrazole, imidazole, pyrazole, 1,2,3-triazole, 1,2,4-triazole, tetrazole, pentazole, oxazole, isooxazole, 1,2,3-oxadiazole, 1,2,4-oxadiazole, furazan, 1,3,4-oxadiazole, thiazole, isothiazole, 1,2,4-thiadiazole, 1,2,5-thiadiazole, 1,3,4-thiadiazole, or a substituted or a functionalized compound thereof.

DETAILED DESCRIPTION OF EXEMPLARY EMBODIMENTS

The invention will now be described in the following detailed description, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

The present disclosure provides for a method that utilizes an environmentally benign chelator (EBC) in conjunction with low levels of azoles (or N-heterocycles), which allow for the reduction or elimination of N-heterocycles and/or AOX. In some embodiments, the use of EBCs, concentrated industrial water, a dispersant, and salt inhibiting polymers provide the necessary surface passivation on iron and copper alloys.

Phosphonates are a common water treatment technology for industrial cooling water systems. They can inhibit mineral scale, as well as, aide in the formation of passivation films on iron and copper alloys. However, many phosphonates can form insoluble salts with calcium or calcium mineral salts limiting their broad use in industrial applications. It is well known that phosphonates will hydrolyze, cleaving at a minimum, the $-PO_3$ functionality, which adds o-$PO_4$ (orthophosphate) to the bulk industrial water. The additional o-PO4 may increase the scaling potential of Ca/PO4 or contribute to the formation of passivation films. Once the phosphonate reverts to o-PO4, the remaining species is no longer an effective scale inhibitor.

Oxidizing biocides (e.g. HOC/OCl—, HOBr/OBr—, $ClO_2$, $H_2O_2$, $O_3$, etc.) accelerate the phosphonate hydrolysis reaction forming degradation products that are no longer effective scale inhibitors. It was surprisingly found that phosphonate reversion species are in fact EBCs that can be used to reduce or eliminate N-heterocycles and/or AOX from industrial cooling systems. Reversion EBCs have been formed utilizing a wide range of phosphonates. Examples of such reversion EBCs formed include, but are not limited to, hydroxyethylydene-1,1-diphosphinate (HEDP), amino-tris-(methylenephosphonate) (AMP), and 1,3-propanediamino-tetramethylenephosphonic acid (PDTMP).

Additionally, it was surprisingly discovered that there are several classes of environmentally benign chelators (EBCs) that can be used under oxidative conditions to either reduce or remove N-heterocycles (or azoles) or AOX from industrial cooling systems while improving either toxicity or biodegradability profiles of the overall cooling program. The decomposition products from the reversion of phosphonates form a complex that synergistically interacts with azoles to provide galvanic protection, as well as, necessary passivation films on iron and copper metallurgies. Thus, EBCs allow for the reduction or elimination of azoles. By reducing or eliminating these known industrial pollutants, such as azoles, the disclosed technology will lower the contribution of AOX.

The disclosed technology is a step towards developing a "green" cooling program by reducing or eliminating these known industrial pollutants, such as azoles. The present invention additionally lowers the contribution of AOX, or the total amount of adsorbable organic halogens (AOX) present. The combination of low levels of azoles and EBCs surprisingly provided improved corrosion rates under elevated oxidation conditions that are standard for controlling microbiological growth.

In one aspect of the disclosed technology, a method to reduce or eliminate N-heterocycles is generally provided. The method comprises providing one or more environmentally benign chelators (EBCs) to an aqueous cooling system, where the aqueous cooling system comprises at least one N-heterocycle in the presence of a halogenating or non-halogenating oxidizer. N-heterocycles refer to any cyclic structure with a nitrogen contained within the ring.

The aqueous cooling system of the present disclosure comprises industrial cooling water systems, recirculating waters, waste waters, the purge water before solids separation, or the like. In some embodiments, the aqueous system is in contact with a metallic surface, particularly copper and iron metallurgies, including their alloys. In some embodiments, an alternative surface may comprise plastic, ceramic, or composite materials. In some embodiments, the composite materials may be a combination of plastics, ceramics, or inorganic material such as carbon-based allotropes.

The environmentally benign chelators (EBCs) work with the existing water, dispersant and salt inhibiting polymers in the aqueous cooling system to allow for improved calcium phosphate passivation films on industrial surfaces. The EBCs used herein fulfill the basic requirements of a Good's buffer, such as buffer capability, they are biologically safe, inexpensive and possess the ability to coordinate to metals.

The environmentally benign chelators (EBCs) may be selected from (1) amino polycarboxylic acids, (2) polyamino acids or nucleic acids, (3) buffers, or (4) mixtures of amino alkylene phosphonic acids and their corresponding hydrolysis products.

In some embodiments, the environmentally benign chelators (EBCs) are amino polycarboxylic acids. By properly substituting an amino organic molecule with one or more carboxylic acid functional groups, an amino polycarboxylic acid that has the ability to chelate metals will result. For example, such methods of substitution include, but are not limited to, Micheal's addition, use of chloro alkylene carboxylic acid derivatives such as chloroacetic acid, or traditional use of formaldehyde and sodium cyanide. Alternatively, in some embodiments, a Mannich reaction with formaldehyde and phosphorous acid can be used to substitute EBCs that are susceptible to reaction with halogenating biocides.

In some embodiments, the amino polycarboxylic acids comprise substituted amino acids having —COOH and/or —PO3. In some embodiments, the amino polycarboxylic acids comprise one or more amino functional groups, wherein the amino polycarboxylic acid is ethylenediamine tetraacetic acid, N-(2-Hydroxyethyl)ethylenediaminetriacetic acid, diethylenetriaminepentaacetic acid, Nitrilotriacetic acid, methylglycin diacetic acid (MGDA), N,N-Dicarboxymethyl glutamic acid tetrasodium salt, (2R,3R,4S,5R,6R)-3,4,6-trihydroxy-5-sulfooxyoxane-2-carboxylic acid, or Ethylenediamine-N,N'-disuccinic acid.

In other embodiments, the environmentally benign chelators are polyamino acids or nucleic acids. The polyamino acid or peptide of the present disclosure may comprise homo polymers of amino acid groups, such as polyaspartic acid, or consist of more than one amino acid, such as a peptide, that is artificially synthesized and performs like an aptamer or isolated from natural and sustainable sources. In some embodiments, the poly nucleic acids consist of various base pairs that form DNA or RNA type of aptamers.

In other embodiments, the environmentally benign chelators are buffers, specifically Good's buffers. In some embodiments, Good's buffers or appropriately functionalized Good's buffers, can be selected from the following families of compounds: morpholinic, piperzinic, bis(2-hydroxyethyl)amine, TRIS, cyclohexylamino, acetamido, and propanol. It should be understood that appropriate functionalization of Good's buffers include the addition of alkyl carboxylic acids similar to synthetic pathways used to construct amino polycarboxylic acids, addition of alkyl sulfonic acids, alkyl phosphonic acids or phosphonic acid, and ring opening of functionalized epoxide moieties.

In some embodiments, appropriately functionalized Goods buffers include, but are not limited to N-(2-Acetamido)-2-aminoethanesulfonic acid (ACES), N-(2-acetamido)iminodiacetic acid (ADA), adenosine monophosphate (AMP), 2-amino-2-methylpropane-1,3-diol (AMPD), 2-hydroxy-3-[(2-hydroxy-1,1-dimethylethyl)amino]-1-propanesulfonic acid (AMPSO), N,N-Bis(2-hydroxyethyl)-2-aminoethanesulfonic acid (BES), Bicine, Bis-Tris, 1,3-bis(tris(hydroxymethyl)methylamino)propane (BTP), calcium alkyl benzene sulphonate (CABS), N-cyclohexyl-3-aminopropanesulfonic acid (CAPS), N-cyclohexyl-2-hydroxyl-3-aminopropanesulfonic acid (CAPSO), 2-(cyclohexylamino)ethanesulfonic acid (CHES), 3-(Bis(2-hydroxyethyl)amino)-2-hydroxypropane-1-sulfonic acid (DIPSO), 3-[4-(2-Hydroxyethyl)-1-piperazinyl]propanesulfonic acid (EPPS), 4-(2-Hydroxyethyl)-1-piperazinepropanesulfonic acid (HEPPS), 4-(4-(2-Hydroxyethyl)piperazin-1-yl)butane-1-sulfonic acid (HEPBS), (4-(2-hydroxyethyl)-1-piperazineethanesulfonic acid) (HEPES), 2-Hydroxy-3-(4-(2-hydroxyethyl)piperazin-1-yl)propane-1-sulfonic acid (HEPPSO), 2-(N-morpholino)ethanesulfonic acid (MES), 4-morpholinobutane-1-sulfonic acid (MOBS), 3-(N-morpholino)propanesulfonic acid (MOPS), 3-morpholino-2-hydroxypropanesulfonic acid (MOPSO), piperazine-N,N'-bis(2-ethanesulfonic acid)(PIPES), piperazine-1,4-bis(2-hydroxypropanesulfonic acid (POPSO), 4-((1,3-dihydroxy-2-(hydroxymethyl)propan-2-yl)amino)butane-1-sulfonic acid (TABS), 3-((1,3-Dihydroxy-2-(hydroxymethyl)propan-2-yl)amino)propane-1-sulfonic acid (TAPS), N-[tris(hydroxymethyl)methyl]-3-amino-2-hydroxypropanesulfonic acid (TAPSO), triethanolamine (TEA), N-tris(hydroxymethyl)methyl-2-aminoethanesulfonic acid (TES), tricine, and tris(hydroxymethyl)aminomethane (Tris).

In other embodiments, the environmentally benign chelators (EBCs) are amino alkylene phosphonic acids or mixtures of amino alkylene phosphonic acids and their corresponding hydrolysis products. In some embodiments, these amino alkylene phosphonic acids are represented by the formula (I)

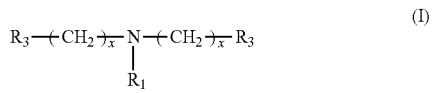

wherein $R_1$ is —$CH_2$—$R_3$, —$(CH_2)_y$—$NR_2$ or —$(CH_2)_y$—NR—$(CH_2)_y$—$NR_2$; $R_2$ is —$(CH_2)_x R_3$; R is —$(CH_2)_x$—$R_3$; and $R_3$ is —$PO_3$ or —OH, wherein $R_3$ is the same or different, and wherein x and y both comprise between one and four carbon atoms. These amino alkylene phosphonic acids are mixed with the hydrolysis compounds comprising, at least one or more, $H_2$—N—$R_1$, $H_2$—N—R, R—NH—$R_1$, R—NH—R, wherein R is R is —$(CH_2)_x$—$R_3$, and $R_1$ is —$CH_2$—$R_3$, —$(CH_2)_y$—$NR_2$ or —$(CH_2)_y$—NR—$(CH_2)_y$—$NR_2$, and $R_2$ is —$(CH_2)_x R_3$; and wherein x and y both comprise between one and four carbon atoms.

In some embodiments, the environmentally benign chelators can be used with a metal cationic salt comprising Ti, Mo, Mn, W, Zn, Al, $SiO_2$, As, Sn, La, Eu or combination thereof.

In some embodiments, the environmentally benign chelators (EBCs) are added in a concentration greater than a concentration of the N-heterocycle(s). In some embodiments, the concentration of the N-heterocycle(s) is less than 1.0 ppm. In other embodiments, the concentration of the N-heterocycle(s) is less than 0.5 ppm, and in other embodiments, the concentration of the N-heterocycle(s) is less than 0.25 ppm.

In some embodiments, the present method reduces the N-heterocycle content by about 0.1 to 100%. In other embodiments, the N-heterocycle content is reduced by about 10-90%, in other embodiments, the N-heterocycle content is reduced by about 25-75%, and in other embodiments, the N-heterocycle content is reduced by about 40-60%.

In some embodiments, the N-heterocycle is an azole. An azole is a five-membered heterocyclic compound containing a nitrogen atom. It should be understood by one skilled in the art that the azole of the present technology may include any type of substituted or functionalized azole molecule.

In some embodiments, wherein the N-heterocycle is an azole, the azole can be an imidazolidone, oxazolidinone, hydantoin, urazole, oxazolidine, imidazolidine, isooxazolidine, pyrazolidine, pyrroline, maleimide, pyrrolin-2-one, 2-isoxazoline, 4-isoxazoline, 2-oxazoline, 3-oxazoline, 2-imidazoline, pyrrole, thiazoline, pyrazoline, 3-pyrazoline, 3H-pyrazole, imidazole, pyrazole, 1,2,3-triazole, 1,2,4-triazole, tetrazole, pentazole, oxazole, isooxazole, 1,2,3-oxadiazole, 1,2,4-oxadiazole, furazan, 1,3,4-oxadiazole, thiazole, isothiazole, 1,2,4-thiadiazole, 1,2,5-thiadiazole, 1,3,4-thiadiazole, or any substituted or functionalized compounds thereof.

In other embodiments, the N-heterocycle is a lactam, sultam, pyridine, hydro-pyridine, pyridone, pyrazine, pyrimidines, triazine, or azepin.

In some embodiments, the environmentally benign chelators (EBCs) are added in a concentration greater than a concentration of the azoles. In some embodiments, the concentration of the azoles are less than 1.0 ppm. In other embodiments, the concentration of the azoles are less than 0.5 ppm, and in other embodiments, the concentration of the azoles are less than 0.25 ppm.

In some embodiments, the present method reduces the azole content by about 0.1 to 100%. In other embodiments, the azole content is reduced by about 10-90%, in other embodiments, the azole content is reduced by about 25-75%, and in other embodiments, the azole content is reduced by about 40-60%.

In some embodiments, the present invention includes an oxidizing treatment or oxidizer. Oxidizers can be antagonistic towards azoles ability to form passivation films. The present method lowers the concentration of azoles in industrial cooling systems below 1.0 ppm, such that calcium phosphate freely forms passivation films without competition for the surface between an azole and the salt. The low levels of azoles work with the added EBCs to provide the necessary galvanic corrosion protection, thus resulting in the reduction in azoles (and AOX), while maintaining and improving performance under elevated levels of oxidation for microbiological control.

In some embodiments, the oxidizer can be selected from sodium hypochlorite (bleach) or hypochlorous acid, sodium hypobromite or hypobromous acid, stabilized bromine, peroxides (inorganic, such as $H_2O_2$, and organic, such as peraceatic acid), ozone. In some embodiments, these oxidizers are added directly to the aqueous phase. In some embodiments, the oxidizer can be halogenating or non-halogenating. A halogenating oxidizer has the ability to add a halogen to organic molecules or polymers.

In some embodiments, a non-halogenating oxidizer is provided. In some embodiments, the non-halogenating oxidizer comprises $ClO_2$, peroxides, or ozone.

In yet another aspect of the present disclosure, a method to reduce or eliminate AOX is provided. The method comprises providing one or more environmentally benign chelators (EBCs) to an aqueous cooling system, where the aqueous cooling system comprises at least one AOX-containing species in the presence of a halogenating biocides or oxidizers.

Adsorbable organic halogen, or AOX, can be characterized as any organic species that has a halogen atom covalently attached to the parent structure, and thus, is able to absorb onto a substrate. Azoles may have inherent absorbable organic halide (AOX) or transient AOX in industrial cooling systems when used with certain oxidizers, such as halogenating oxidizers (e.g. bleach or bromine). Molecules or polymers that possess a halogen on the molecular skeleton or polymer backbone are inherently an AOX species.

In some embodiments, the present method provides for at least one AOX-containing species comprising (1) an inherently-containing AOX molecule, or (2) a transient containing AOX molecule.

In some embodiments, an inherent or inherently-containing AOX species is provided, characterized by a halogen being covalently added to the parent structure ex-situ and off site of the industrial aqueous stream. An inherently AOX species may be generated in significant concentration utilizing mixing tanks or mechanical apparatus, which combine adequate halogenating reagents, on site of an industrial system and just prior to adding to an industrial aqueous stream.

Examples of inherently-containing AOX molecules include, but are not limited to, chloro benzotriaozle, bromo benzotriazole, chloro-tolyltriazole, bromo-tolyltriazole, 5-chloro-1-phenyl-1H-tetrazole, or 5-(4-chlorophenyl)-1H- tetrazole. In some embodiments, the inherently-containing AOX molecule is an inherently AOX azole under halogenating or non-halogenating conditions.

In some embodiments, a transient AOX species is formed where a covalent halogen bond is provided in-situ of the industrial aqueous stream due to the presence of a reactive organic species and a halogenating oxidizing biocide. The transient AOX species will exist in an equilibrium between the parent molecule and the halogenating transient AOX product. In some embodiments, the inherently AOX species can react with a chlorinating or brominating oxidizer in situ to form transient AOX species that exist in an equilibrium, where at least 0.1% of the molar concentration of the azole exists as AOX. Thus, at any given time in the industrial stream a proportion of the concentration of the organic species always exists as a transient AOX.

In some embodiments, the AOX-containing species comprises a transient containing AOX molecule. Examples of a transient containing AOX molecules include, but are not limited to, 1-N-chloro benzotriazole, 1-N-chloro-tolyltriazole, 1-N-chloro-chlorotolyltriazole, 1-N-bromo benzotriazole, 1-N-bromo-tolyltriazole, or 5-phenyl-1N-chlorotetrazole.

In some embodiments, the disclosed method lowers the AOX contribution by 0.1 to 100%. In other embodiments, the disclosed method lowers the AOX contribution by at least 75%, and in other embodiments, at least 50%.

In some embodiments, a halogenating biocide is utilized. In some embodiments, the halogenating biocide comprises bleach, chlorine, or bromine.

In yet another aspect of the disclosed technology, a composition to reduce or eliminate azoles or AOX from an aqueous cooling system is provided. In some embodiments, the composition comprises an (i) dispersant polymer; (ii) a salt inhibitor; (iii) biocide; (iv) pH adjusting species; (v) EBC; (vi) metal inhibitor; and (vii) N-heterocycle. In other embodiments, the composition comprises an (i) dispersant polymer; (ii) a salt inhibitor; (iii) biocide; (iv) pH adjusting species; (v) EBC; (vi) metal inhibitor; and/or (vii) N-heterocycle.

In some embodiments, a salt inhibitor and a pH adjusting species are added depending on their need to inhibit scale or corrosion. In some embodiments, a metal inhibitor is included in instances when a pH target set point is designated. However, in some industrial aqueous applications cases, no pH set point is targeted and the pH of the water can reach its natural pH target based on the water characteristics and buffer capacity.

In some embodiments, the industrial aqueous stream being treated consists of mineral cation and anions. Typical characteristic cations are $Ca^{2+}$ and $Mg^{2+}$ whose concentration ranges from 0 to 10,000 ppm. Typical characteristic anions consist of $Cl^-$, $SO_4^{2-}$, $PO_4^{3-}$, $HCO_3^-$, and $CO_3^{2-}$ whose concentration range from 0 to 100,000 ppm. Group 1 cations can also be found and typically aide in balancing the overall charge of the aqueous matrix. Various forms of silicate and silica can characterize the aqueous stream whose concentration range from 0 to 1000 ppm.

In some embodiments, the industrial aqueous stream may be treated with metal cations to improve corrosion control. In some embodiments, the metal cationic salt comprising transition metals, p-block metals, p-block semi metals, $SiO2$, silicates and metal silicates, lanthanides, and actinides. In some embodiments, the metal cationic salts that may be added include, but not limited, are Ti, Mo, Mn, W, Zn, Al, Silica ($SiO_2$), As, Sn, La, and Eu. These may be added in a concentration of 0 to 100 ppm as the cationic metal salt.

In some embodiments, a salt or scale inhibitor may be added to the aqueous stream. Salt inhibitors are typically polycarboxylic acid molecules or low molecule weight polymers (<10,000 MW). Phosphonates are also traditionally used as salt and scale inhibitors. Salt inhibitors are added to the aqueous stream when a particular salt is super saturated, where the calculated SI is greater than 1. Salt inhibitors concentration may be added from 0 to 100 ppm.

In some embodiments, a polymeric dispersant and/or salt inhibitor is added to the aqueous stream. In some embodiments, the polymeric dispersant and/or salt inhibitor is a polycarboxylic acid-based polymer where at least one additional monomer consists of a sulfonic acid group. The dispersant monomer will suspend super saturated salts in solution, suspended solids, and metal oxide colloids and prevent fouling or scale on metal surfaces.

In some embodiments, a biocide is fed to the industrial system that augments the microenvironment of microbiological species. In some embodiments, the biocide may be oxidizing or non-oxidizing. Additionally, a biodispersant may be added with a biocide. In some embodiments, the biodispersant can be an anionic, cationic, or nonionic surfactant.

In some embodiments a pH adjusting agent/species is added to the aqueous stream. A pH adjusting agent/species comprises any salt, inorganic, or organic species that allows the pH to change to a targeted set point. Examples include, but are not limited to, sulfuric acid, hydrochloric acid, sodium hydroxide, caustic, sodium bicarbonate, CO2, and citric acid.

EXPERIMENTAL

Table 1 and 2 provides experimental test runs of the present method that provides for a treatment which is stable to halogenation, yet provides good corrosion resistance.

A recirculating testing rig was provided. The rig had a total volume of ~1.4 L and was equipped with a sump pump, by-pass rack for corrosion coupons and probes, Plexiglas encased heat exchanger, and probes to control pH and ORP. The water chemistry is explained below. The heat exchanger was fitted with an electrical heater to control heat load, 0-11,000 BTU/ft2/hr, and flowmeters, 0-4.6 ft/sec. Corrosion rates were monitored using Corrator meters fitted in the by-pass rack. Weight loss corrosion rates were calculated by inserting coupons into the bypass rack for the duration of the testing period, 7-8 days. The pH was controlled using a sulfuric acid drip. Oxidation Reduction Potential (ORP) was controlled to the desired Free Residual Chlorine (FRC) level as determined by the Hach powder pack method. Water flow was maintained at ~4 ft/sec and bulk water temperature was controlled at 120° F.

TABLE 1

| Run # | N-Heterocycle | Dose (ppm) | EBC | Dose (ppm) | AOX (ppb) | o-PO4 (ppm) | Bleach (ppm) | ADM-C (mpy) | ADM-P (mpy) | LCS-C (mpy) | LCS-P (mpy) |
|---|---|---|---|---|---|---|---|---|---|---|---|
| 1 | Cl-tolyltriazole | 2 | | | 500 | 15 | 0.3 | 0.2 | 0.1 | 0.4 | 0.2 |
| 2 | Cl-tolyltriazole | 2 | | | 500 | 15 | 1 | 0.4[a] | 0.1 | 0.7 | 0.2 |
| 3 | Cl-tolyltriazole | 0.5 | | | 100 | 17 | 1 | 0.2 | 0.2 | 3.2 | 0.5 |
| 4 | Cl-tolyltriazole | 0.5 | AMTP | 3 | 100 | 17 | 1 | 0.2 | 0.1 | 0.5 | 0.3 |
| 5 | Cl-tolyltriazole | 0.5 | HEDP | 3 | 100 | 17 | 1 | 0.2 | 0.1 | 1.3 | 0.4 |
| 6 | Cl-tolyltriazole | 0.5 | Poly Asp | 3 | 100 | 15 | 1 | 0.3 | 0.1 | 1.6 | 0.8 |
| 7 | Cl-tolyltriazole | 0.5 | Trilon M | 3 | 100 | 15 | 1 | 0.3 | 0.1 | 0.5 | 0.3 |
| 8 | Cl-tolyltriazole | 0.5 | PMDT | 3 | 100 | 17 | 1 | 0.3 | 0.2 | 0.5 | 0.3 |
| 9 | Cl-tolyltriazole | 0.5 | Tricine | 3 | 100 | 15 | 1[b] | 0.3 | 0.2 | 2.5 | 0.6 |
| 10 | Cl-tolyltriazole | 0.5 | bis-tris | 3 | 100 | 15 | 1[b] | 0.3 | 0.2 | 2.3 | 2.9 |
| 11 | Cl-tolyltriazole | 0.5 | bicine | 3 | 100 | 15 | 1[b] | 0.3 | 0.2 | 1.9 | 1.8 |
| 12 | Cl-tolyltriazole | 0.5 | ADA | 3 | 100 | 15 | 1[b] | 0.4 | 0.1 | 0.9 | 0.8 |
| 13 | Cl-tolyltriazole | 0.5 | Gluconate | 4 | 100 | 15 | 1 | 0.2 | 0.2 | 3.2 | 0.5 |
| 14 | Cl-tolyltriazole | 0.5 | Gluco-heptonate | 3 | 100 | 15 | 1 | 0.3 | 0.1 | 1.6 | 1.0 |

Water Characteristics as provided in Table 1: 600 ppm Ca as $CaCO_3$, 300 ppm Mg as $CaCO_3$, 50 ppm M-Alkalinity as $CaCO_3$, 3 ppm of p-$PO_4$ as $PO_4$, 485 ppm $Cl^-$, 285 ppm $SO_4^{2-}$, pH=7.2; ADM- and LCS-C refer to the average weight loss of coupons; ADM- and LCS-P refer to the average instantaneous corrosion rates over the entire duration of the test; AOX refers to the inherent AOX concentration; bleach is a measure of the residual free chlorine as determined by the Hach powder pack test. In addition to the N-heterocycle and EBC a dispersant polymer was added to the aqueous system to maintain a 6 ppm concentration. Chemical dose based % actives. [a]Coupon had significant areas of dezincification. [b]Tests runs measured a delta >0.1 ppm between (Total Chlorine–Residual Chlorine) powder tests from Hach.

Table 1 represents exemplary data to reduce or eliminate N-heterocycles and AOX from/in neutral industrial conditions. Runs 1 and 2 in Table 1 represent typical cooling programs utilizing the N-heterocycle chloro-tolytriazole that differ only in the ppm of the residual free chlorine. Increasing the free chlorine results in a much more corrosive environment as seen by the elevated corrosion rates of the coupon results in Run 2. Also seen in Run 2, that is not fully represented by a corrosion rate number, is the appearance of dezincification or dealloying of the copper metallurgy. A longer test would ultimately result in much higher corrosion rates.

EBCs in Runs 4, 5, and 8 illustrate the ability of EBCs to lower the N-heterocycle content from 2 to 0.5 ppm, as well as, decreasing the inherent AOX from 500 to 100 ppb. The o-PO4 concentrations increased by 2 ppm due to reversion of the phosphonates. Control Run 3 was done to show that without the EBC present, while increasing the o-PO4 concentration by 2 ppm, resulted in significantly higher corrosion rates on LCS coupons. Runs 4 and 5 also illustrate that not all phosphonates will perform the same with Run 4 outperforming Run 5 for both ADM and LCS coupons versus the control Run 2. The combination of EBC in Run 4 and the hydrolysis products are better at passivating metal surfaces and chelating soluble copper for galvanic protection.

All examples in Table 1 can effectively protect copper and copper alloy surfaces compared to control Runs 1 and 2. Runs 9 to 12 all displayed significant delta values in the Total chlorine versus residual free chlorine. Indicating that the EBCs are susceptible to some form of halogenation from the halogenating oxidizer, bleach. These EBCs may be better suited for systems with non-halogenating oxidizer or can be suitably functionalized with alkylene carboxylic or phosphonic acid.

Runs 13-14 are examples of chelators that have appreciable binding constants to copper. Despite this property they are not as effective at protecting metal surfaces as other EBCs. EBCs are not selected just based on metal binding constants and be effective at reducing N-heterocycles and/or AOX while maintaining performance.

Table 2 has exemplary examples of using EBCs in alkaline industrial cooling conditions. Run 3 shows the ability to use an EBC to lower both the N-heterocycle (azole) and the AOX in the testing water. Run 4 validates the ability to use EBCs to reduce just N-heterocycles (azoles) in industrial water. The EBC GLADMP is also an example of how an amino acid, glycine, can be substituted with proper functional groups that impart halogen stability and activity as an EBC. Glycine's amine functional group was reacted with 2 equivalents of chloroacetic acid (see exemplary procedure).

Table 2 provides results as in an alkaline industrial water system. In Table 2, run 4 offers an example where the transient AOX is reduced by using an EBC. Published literature has estimates of tolyltriazole as forming ~10% transient 1-N-chloro-tolyltriazole. Using standard methods of measuring AOX it has been found that tolyltriazole, 3 ppm sample, and benzotriazole, 1.5 ppm sample, contribute 97 μg Cl/L and 46 μg Cl/L respectively. Therefore, run 4 is able to reduce the transient AOX from 97 μg Cl/L to potentially 16 μg Cl/L in addition to reducing the azole concentration.

TABLE 2

| Run # | N-Heterocycle | Dose (ppm) | EBC | Dose (ppm) | AOX (ppb) | oPO4 (ppm) | Bleach (ppm) | ADM-C | ADM-P | LCS-C | LCS-P |
|---|---|---|---|---|---|---|---|---|---|---|---|
| 1 | Cl-tolyltriazole | 2 | | | 500 | 6 | 1 | 0.2 | 0.04 | 1.2 | 1.8 |
| 2 | Tolyltriazole | 3 | | | | 6 | 1 | 0.19 | 0.02 | 1.73 | 1.56 |
| 3 | Cl-tolyltriazole | 0.5 | Trilon-M | 3 | 100 | 6 | 1 | 0.13 | 0.06 | 1.53 | 1.68 |
| 4 | Tolyltriazole | 0.5 | GLADMP | 3 | | 6 | 1 | 0.05 | 0.03 | 1.52 | 1.38 |

Water Characteristics as provided in Table 2: 400 ppm Ca as $CaCO_3$, 150 ppm Mg as $CaCO_3$, 200 ppm M-Alkalinity as $CaCO_3$, ppm $Cl^-$, ppm $SO_4^{2-}$, pH=8.6; ADM- and LCS-C refer to the average weight loss of coupons; ADM- and LCS-P refer to the average instantaneous corrosion rates over the entire duration of the test; AOX refers to the inherent AOX concentration; bleach is a measure of the residual free chlorine as determined by the Hach powder pack test. In addition to the N-heterocycle and EBC a dispersant polymer was added to the aqueous system to maintain an 8 ppm concentration. An additional salt inhibitor was added in 8 ppm for scale control. Chemical dose based on % actives.

The synthesis of GLADMP (or synthesis of Bis(phosphonomethyl)glycine using Mannich-Type Reaction with Phosphorous Acid) as shown in Table 2 was performed according to the following: In a 4-neck flask fitted with a thermometer, stirrer, condenser, and feed line, 46.62 g (0.56 moles) of phosphorous acid was dissolved in 55.00 mL of DI water. Secondly, 21.07 g (0.28 moles) of glycine and 27.59 g (0.28 moles) of 37% HCl were added to the flask and heated to reflux at 105° C. Once at reflux, 53.57 g (0.66 moles, 20% excess) of 37% formaldehyde was charged over a 1-hour period. After the addition was complete, the solution was held at reflux for 3 hours and then cooled to 25° C. The pH of the solution was adjusted from 0.64 to 5.24 by adding 91.42 g (1.14 moles) of 50% caustic. The mass of the product solution was 288.19 g at 39.73% solids.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for inhibiting corrosion on metal surfaces in contact with an aqueous cooling system, wherein the method uses a reduced level of N-heterocycles, the method comprising:
providing one or more chelators to an aqueous cooling system, wherein the aqueous cooling system comprises:
at least one N-heterocycle in the presence of a halogenating or non-halogenating oxidizer, wherein the at least one N-heterocycle has a concentration of less than 1.0 ppm and the one or more chelators are added in a concentration greater than the concentration of the at least one N-heterocycle, and wherein the one or more chelators comprise (1) amino polycarboxylic acids, (2) polyamino acids or nucleic acids, (3) buffers, or (4) mixtures of amino alkylene phosphonic acids and their corresponding hydrolysis products.

2. The method as recited in claim 1, wherein the amino polycarboxylic acids comprise substituted amino acids having —COOH and/or —PO3, or a combination thereof.

3. The method as recited in claim 1, wherein the amino polycarboxylic acids comprise one or more amino functional groups, wherein the amino polycarboxylic acid is ethylenediamine tetraacetic acid, N-(2-Hydroxyethyl)ethylenediaminetriacetic acid, diethylenetriaminepentaacetic acid, Nitrilotriacetic acid, methylglycin diacetic acid (MGDA), N,N-Dicarboxymethyl glutamic acid tetrasodium salt, (2R,3R,4S,5R,6R)-3,4,6-trihydroxy-5-sulfooxyoxane-2-carboxylic acid, or Ethylenediamine-N,N'-disuccinic acid.

4. The method as recited in claim 1, wherein the polyamino acid is polyaspartic acid or a peptide comprising more than one amino acid.

5. The method as recited in claim 1, wherein a buffer is selected from the group consisting of N-(2-Acetamido)-2-aminoethanesulfonic acid, N-(2-acetamido)iminodiacetic acid, adenosine monophosphate, 2-amino-2-methylpropane-1,3-diol, 2-hydroxy-3-[(2-hydroxy-1,1-dimethylethyl)amino]-1-propanesulfonic acid, N,N-Bis(2-hydroxyethyl)-2-aminoethanesulfonic acid, Bicine, Bis-Tris, 1,3-bis(tris(hydroxymethyl)methylamino)propane, calcium alkyl benzene sulphonate, N-cyclohexyl-3-aminopropanesulfonic acid, N-cyclohexyl-2-hydroxyl-3-aminopropanesulfonic acid, 2-(cyclohexylamino)ethanesulfonic acid, 3-(Bis(2-hydroxyethyl)amino)-2-hydroxypropane-1-sulfonic acid, 3-[4-(2-Hydroxyethyl)-1-piperazinyl]propanesulfonic acid, 4-(2-Hydroxyethyl)-1-piperazinepropanesulfonic acid, 4-(4-(2-Hydroxyethyl)piperazin-1-yl)butane-1-sulfonic acid, 4-(2-hydroxyethyl)-1-piperazineethanesulfonic acid, 2-Hydroxy-3-(4-(2-hydroxyethyl)piperazin-1-yl)propane-1-sulfonic acid, 2-(N-morpholino)ethanesulfonic acid, 4-morpholinobutane-1-sulfonic acid, 3-(N-morpholino)propanesulfonic acid, 3-morpholino-2-hydroxypropanesulfonic acid, piperazine-N,N'-bis(2-ethanesulfonic acid), piperazine-1,4-bis(2-hydroxypropanesulfonic acid, 4-((1,3-dihydroxy-2-(hydroxymethyl)propan-2-yl)amino)butane-1-sulfonic acid, 3-((1,3-Dihydroxy-2-(hydroxymethyl)propan-2-yl)amino)propane-1-sulfonic acid, N-[tris(hydroxymethyl)methyl]-3-amino-2-hydroxypropanesulfonic acid, triethanolamine, N-tris(hydroxymethyl)methyl-2-aminoethanesulfonic acid, tricine, tris(hydroxymethyl)aminomethane, or a substituted or a functionalized compound thereof.

6. The method as recited in claim 1, wherein the amino alkylene phosphonic acids are represented by the formula (I)

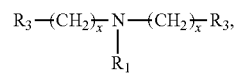

wherein $R_1$ is —$CH_2$—$R_3$, —$(CH_2)_y$—$NR_2$ or —$(CH_2)_y$—$NR$—$(CH_2)_y$—$NR_2$; and wherein R is —$(CH_2)_x$—$R_3$; $R_2$ is —$(CH_2)_x R_3$; and $R_3$ is —$PO_3$ or —OH, wherein $R_3$ is the same or different, and wherein y is between 1 and 4, and x is between 1 and 4.

7. The method as recited in claim 1, wherein the one or more chelators can be used with a metal cationic salt comprising transition metals, p-block metals, p-block semi metals, $SiO2$, silicates and metal silicates, lanthanides, and actinides.

8. The method as recited in claim 1, wherein the at least one N-heterocycle is an azole, cyclic amine, lactam, sultam, pyridine, hydro-pyridine, pyridone, pyrazine, pyrimidines, triazine, or azepin.

9. The method as recited in claim 8, wherein the azole is an imidazolidone, oxazolidinone, hydantoin, urazole, oxazolidine, imidazolidine, isooxazolidine, pyrazolidine, pyrroline, maleimide, pyrrolin-2-one, 2-isoxazoline, 4-isoxazoline, 2-oxazoline, 3-oxazoline, 2-imidazoline, pyrrole, thiazoline, pyrazoline, 3-pyrazoline, 3H-pyrazole, imidazole, pyrazole, 1,2,3-triazole, 1,2,4-triazole, tetrazole, pentazole, oxazole, isooxazole, 1,2,3-oxadiazole, 1,2,4-oxadiazole, furazan, 1,3,4-oxadiazole, thiazole, isothiazole, 1,2,4-thiadiazole, 1,2,5-thiadiazole, 1,3,4-thiadiazole, or a substituted or a functionalized compound thereof.

10. The method as in claim 1, wherein the non-halogenating oxidizer comprises $ClO_2$, inorganic peroxides, organic peroxides, or ozone.

11. The method as recited in claim 1, wherein the one or more chelators can be used with a metal cationic salt comprising transition metals, p-block metals, p-block semi metals, SiO2, silicates and metal silicates, lanthanides, and actinides.

12. The method as recited in claim 1, wherein the N-heterocycle has a concentration that is less than or equal to 0.5 ppm.

13. The method as recited in claim 1, wherein the N-heterocycle has a concentration that is less than 0.25 ppm.

14. The method as recited in claim 1, wherein the N-heterocycle has a concentration from 0.5 ppm to less than 1 ppm.

* * * * *